(12) United States Patent
Cherukuri

(10) Patent No.: US 7,020,736 B1
(45) Date of Patent: Mar. 28, 2006

(54) METHOD AND APPARATUS FOR SHARING MEMORY SPACE ACROSS MUTLIPLE PROCESSING UNITS

(75) Inventor: Ravikrishna Cherukuri, San Jose, CA (US)

(73) Assignee: Redback Networks Inc., San Jose, CA (US)

( * ) Notice: Subject to any disclaimer, the term of this patent is extended or adjusted under 35 U.S.C. 154(b) by 1027 days.

(21) Appl. No.: 09/740,184

(22) Filed: Dec. 18, 2000

(51) Int. Cl.
*G06F 12/00* (2006.01)

(52) U.S. Cl. .......................... 711/5; 711/150; 711/157; 711/163

(58) Field of Classification Search .................. 711/5, 711/147, 150, 151, 153, 163, 206–211, 101–106
See application file for complete search history.

(56) References Cited

U.S. PATENT DOCUMENTS

| | | | |
|---|---|---|---|
| 4,667,324 A | | 5/1987 | Graves |
| 4,736,363 A | | 4/1988 | Aubin et al. |
| 5,159,595 A | | 10/1992 | Flanagan et al. |
| 5,175,842 A | * | 12/1992 | Totani ........................ 711/161 |
| 5,608,733 A | | 3/1997 | Vallee et al. |
| 5,659,695 A | * | 8/1997 | Kelley et al. ................... 711/5 |
| 5,729,717 A | * | 3/1998 | Tamada et al. ............. 711/164 |
| 5,860,083 A | * | 1/1999 | Sukegawa .................... 711/103 |
| 6,205,142 B1 | | 3/2001 | Vallee |
| 6,373,849 B1 | * | 4/2002 | Noonan ...................... 370/408 |
| 6,381,239 B1 | * | 4/2002 | Atkinson et al. ........... 370/362 |
| 6,415,350 B1 | * | 7/2002 | Asoh .......................... 711/103 |
| 6,446,181 B1 | * | 9/2002 | Ramagopal et al. ........ 711/168 |
| 6,504,785 B1 | * | 1/2003 | Rao ....................... 365/230.05 |
| 6,507,885 B1 | * | 1/2003 | Lakhani et al. ................ 711/5 |
| 6,542,956 B1 | * | 4/2003 | Lee et al. .................... 711/103 |
| 6,567,900 B1 | * | 5/2003 | Kessler ....................... 711/157 |
| 6,760,255 B1 | * | 7/2004 | Conley et al. ......... 365/185.11 |

OTHER PUBLICATIONS

P.K. Jha, "Bandwidth Maximization for SONET/SDH and Direct Data over Optical Networks," http://www.isoc.org/inet2000/cdproceedings/1g/1g_3.htm, pp. 1-26, Nov. 16, 2000.

* cited by examiner

*Primary Examiner*—Zarni Maung
*Assistant Examiner*—Van Kim T. Nguyen
(74) *Attorney, Agent, or Firm*—Blakely, Sokoloff, Taylor & Zafman LLP

(57) ABSTRACT

A method and apparatus for sharing memory space of multiple memory units by multiple processing units are described. In an embodiment, a method includes storing a set of data across more than one of at least two memory units upon determining that the number of sets of data is static. The method also includes storing the set of data within a single memory unit of the at least two memory units upon determining that the set of data is dynamic.

41 Claims, 6 Drawing Sheets

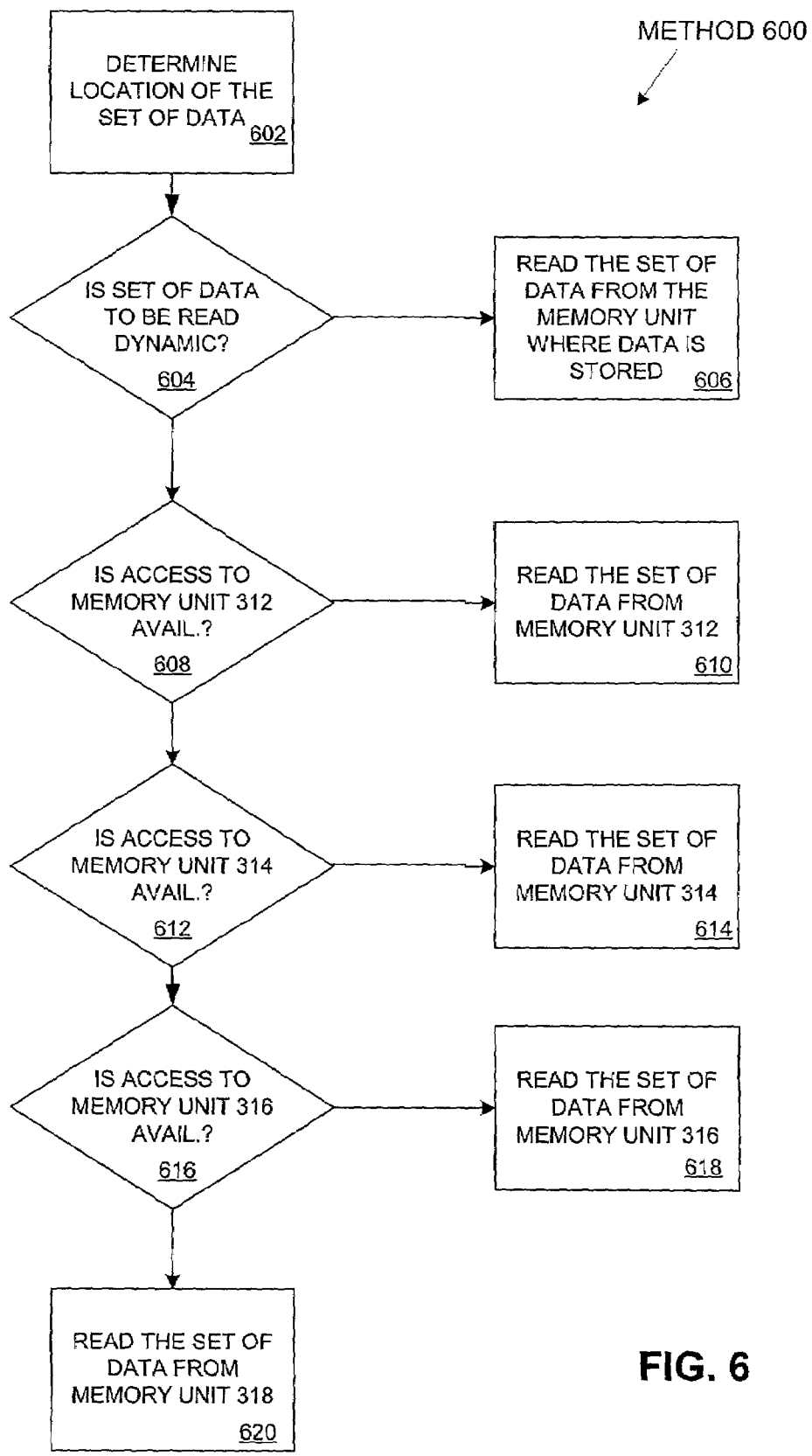

METHOD AND APPARATUS FOR SHARING MEMORY SPACE ACROSS MUTLIPLE PROCESSING UNITS

FIELD OF THE INVENTION

The invention relates to the field of computer processing and memory accessing. More specifically, the invention relates to accessing of multiple memory units by multiple processing units.

BACKGROUND OF THE INVENTION

With the continued increase in high-speed processing by various processing units, the need for higher-speed accessing of memory units located "off-chip" of such processing units has become increasingly critical. One example where such computer processing has become increasingly critical is in the field of telecommunications. Network elements are located across and within different networks in the telecommunications industry to process or switch all of the different packets that are received. In particular, a given network element includes a number of different ports to receive and transmit packets of data therefrom. Accordingly, upon receipt of a given packet of data on a port, a network element determines which port to transmit this packet out from. In a typical network element, there are a number of different line cards having a number of different ports that are each receiving and/or transmitting packets of data. These network elements must, therefore, be able to buffer and process or switch these packets at very high data rates.

Accordingly, certain network elements incorporate multiple processors and multiple memory units in order to process or switch all of these data packets being received. Different network elements incorporate different configurations for the incorporation of multiple processors and multiple memory units. In one such configuration, a network element establishes a one-to-one relationship between a given memory unit, such as a dynamic random access memory (DRAM), and a given processor such that temporary storage of data for this processor is provided by this particular memory unit. However, this one-to-one configuration between a processor and a memory unit may not allow for the optimal accessing of data from the memory units, as a given processor may only access one memory unit during operation.

In an alternative configuration, a network element allows for sharing of these multiple memory units by the multiple processors. Accordingly, one processor can access data from any of the multiple memory units. However, this configuration can also be problematic as bottlenecking may occur during the accessing of the different memory units when multiple processors may try to access data from the same memory unit at the same time.

SUMMARY OF THE INVENTION

A method and apparatus for sharing memory space of multiple memory units by multiple processing units are described. In an embodiment, a method includes storing a set of data across more than one of at least two memory units upon determining that the number of sets of data is static. The method also includes storing the set of data within a single memory unit of the at least two memory units upon determining that the set of data is dynamic.

In another embodiment, a method for accessing a set of data from a number of memory units includes reading the set of data from a single memory unit from the number of memory units, upon determining that the set of data is dynamic. The method also includes reading the set of data from any of the number of memory units, upon determining that the set of data is static.

In one embodiment, an apparatus includes a first memory unit to store a set of static data and a first set of dynamic data. The apparatus also includes a second memory unit coupled to the first memory unit. The second memory unit stores the set of static data and a second set of dynamic data. Additionally, the apparatus includes a first processing unit coupled to the first and second memory units. The first processing unit can read the set of static data from the first memory unit or the second memory unit. Moreover, the apparatus includes a second processing unit coupled to the first and second memory units and the first processing unit. The second processing unit can read the set of static data from the first memory unit or the second memory unit.

BRIEF DESCRIPTION OF THE DRAWINGS

Embodiments of the invention may be best understood by referring to the following description and accompanying drawings which illustrate such embodiments.

In the drawings:

FIG. 6 is a flowchart for accessing or reading of data within memory units 312–318, according to embodiments of the present invention.

DETAILED DESCRIPTION

A method and apparatus for sharing memory space of multiple memory units by multiple processing units are described. Embodiments of the present invention are described herein in terms of a multiple processing units and multiple memory units inside of a network element for the processing or switching of data packets within a network. However, embodiments of the present invention are not so limited, as such embodiments may be incorporated into other types of systems for other types of processing. Additionally, portions of the detailed description describe "packets" in terms of Internet Protocol (IP) packets. However, embodiments of the present invention are not so limited, as other types of packet data can be incorporated into embodiments of the present invention. In particular, the term "packet" may include, but is not limited to, Asynchronous Transfer Mode (ATM) cell, Frame Relay packets and voice over IP packets. Moreover, in the following description, for purposes of explanation, numerous specific details are set forth in order to provide a thorough understanding of the present invention. It will be evident, however, to one skilled in the art that the present invention may be practiced without these specific details.

Figure 1:
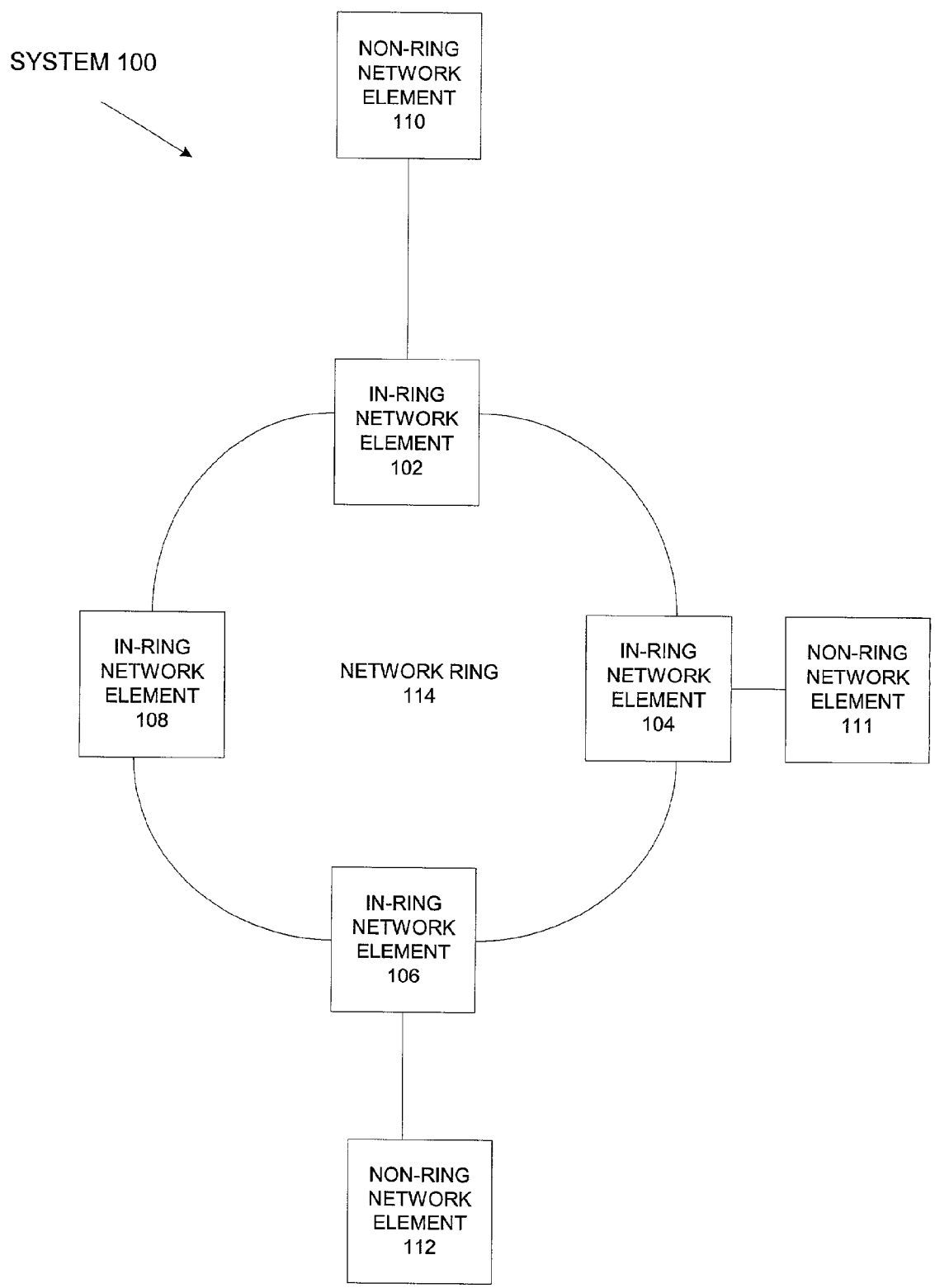
FIG. 1 is block diagram illustrating a system that incorporates embodiments of the present invention.

FIG. 1 is block diagram illustrating a system that incorporates embodiments of the present invention. In particular, FIG. 1 illustrates system 100 that includes network ring 114, which is comprised of in-ring network element 102, in-ring network element 104, in-ring network element 106 and in-ring network element 108. System 100 also include non-ring network element 110, non-ring element 111 and non-ring network element 112, which are coupled to network ring 114 through in-ring network element 102, in-ring network element 104 and in-ring network element 106, respectively. In an embodiment, non-ring elements 110–112 are routers. However, embodiments are not so limited, as non-ring elements 110–112 can be any other type of network element that can transmit and/or receive Internet Protocol (IP) packets. For example, non-ring elements 110–112 could be a switch or bridge within a telecommunications network.

In one embodiment, the connection among in-ring network element 102, in-ring network element 104, in-ring network element 106 and in-ring network element 108 allow for bi-directional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network (SONET) standard or Synchronous Digital Hierarchy (SDH). In one embodiment, data traffic among in-ring network element 102, in-ring network element 104, in-ring network element 106 and in-ring network element 108 includes both Time Division Multiplexing (TDM) traffic as well as Internet Protocol (IP) traffic within a same SONET signal. A further description of the operation of system 100 and the network elements therein is described in more detail below.

The architecture and configuration of system 100 is by way of example and not by way of limitation, as embodiments of the present invention can be incorporated in other types of systems. For example, other such systems could incorporate less or more network elements into the network ring and/or network elements attached thereto. Moreover, embodiments of the present invention are not limited to the network ring architecture as illustrated in FIG. 1. Examples of other types of network architectures that can incorporate embodiments of the present invention include, but are not limited to, a point-to-point configuration, point-to-multi-point configuration and/or a hub configuration.

Figure 2:
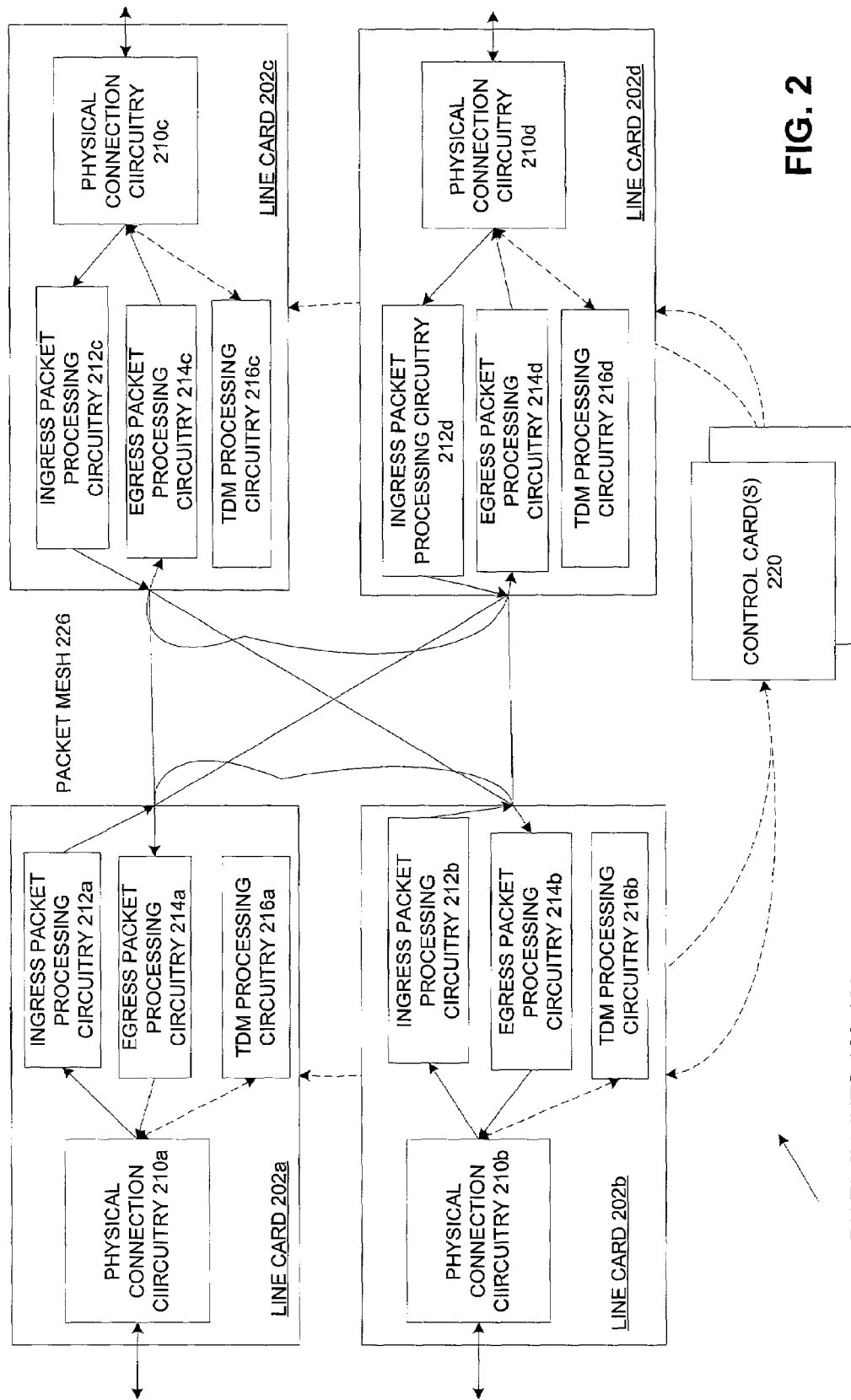
FIG. 2 illustrates portions of in-ring network elements 102–108, according to embodiments of the present invention.

FIG. 2 illustrates portions of in-ring network elements 102–108 (for purposes of FIG. 2, hereinafter "network element 102"), according to embodiments of the present invention. As shown, network element 102 includes line cards 202a–d and control card(s) 220, such that control card(s) 220 are coupled to each of line cards 202a–d. The number of line cards illustrated are for the sake of simplicity and not by way of limitation, as a lesser or greater number of line cards can be included within network element 102. Additionally, network element 102 includes packet mesh 226, which includes a full mesh such that each of line cards 202a–d are coupled to one another. For example, line card 202a is coupled to line cards 202b–d through packet mesh 226. However, embodiments of the present invention are not limited to a full mesh for the transmission of packets among line cards 202a–d, as any type of switching method that switches based on the addressing scheme described herein can be incorporated into embodiments of the present invention. For example, in one embodiment, line cards 202a–d could be coupled together using a switch fabric, such that the line cards are coupled to a control card, which provides for the switching therein.

Line cards 202a–d include physical connection circuitry 210a–d, ingress packet processing circuitry 212a–d, egress packet processing 214a–d and TDM processing circuitry 216a–d, respectively. Physical connection circuitry 210a–d can be coupled to lines external to network element 102, as shown, which can carry optical and/or electrical signals. In one embodiment, line cards 202a–d of network element 102 may be connected to an optical line transmitting SONET OC-N signals. Moreover, in an embodiment, line cards 202a–d of network element 102 may be connected to an electrical line such as a T1, T3, E1, E3, Ethernet, Gigabit Ethernet, etc.

In an embodiment, each line card 202a–d can be coupled to four optical and/or electrical lines. In another embodiment, each line card 202a–d can be coupled to eight optical and/or electrical lines. However, embodiments of the present invention are not so limited, as a lesser or greater number of optical and/or electrical lines can be coupled to network element 102 through line cards 202a–d. Additionally, physical connection circuitry 210a–d are coupled to ingress packet processing circuitry 212a–d, respectively, such that IP packet data being received from the optical and/or electrical lines is passed from physical connection circuitry 210a–d to ingress packet processing circuitry 212a–d, respectively.

Ingress packet processing circuitry 212a–d is coupled to packet mesh 226. Accordingly, each ingress packet processing circuitry 212a–d is coupled to each egress packet processing circuitry 214a–d, respectively, on other line cards 202a–d through packet mesh 226. Moreover, egress packet processing circuitry 214a–d is respectively coupled to physical connection circuitry 210a–d, such that IP packet data traffic coming in from packet mesh 226 from ingress packet processing circuitry 212a–d is transmitted from egress packet processing circuitry 214a–d to physical connection circuitry 210a–d, respectively.

With regard to the TDM data traffic, a switch fabric is formed among line cards 202a–d and control cards 220, as illustrated by the dashed lines in FIG. 2. In particular, physical connection circuitry 210a–d is coupled to TDM processing circuitry 216a–d, respectively, for the receiving and transmitting of TDM data traffic into and out of network element 102. Moreover, each of TDM processing circuitry 216a–d is coupled to control cards 220, such that TDM data traffic transmitted among line cards 202a–d is switched through control cards 220.

Figure 3:
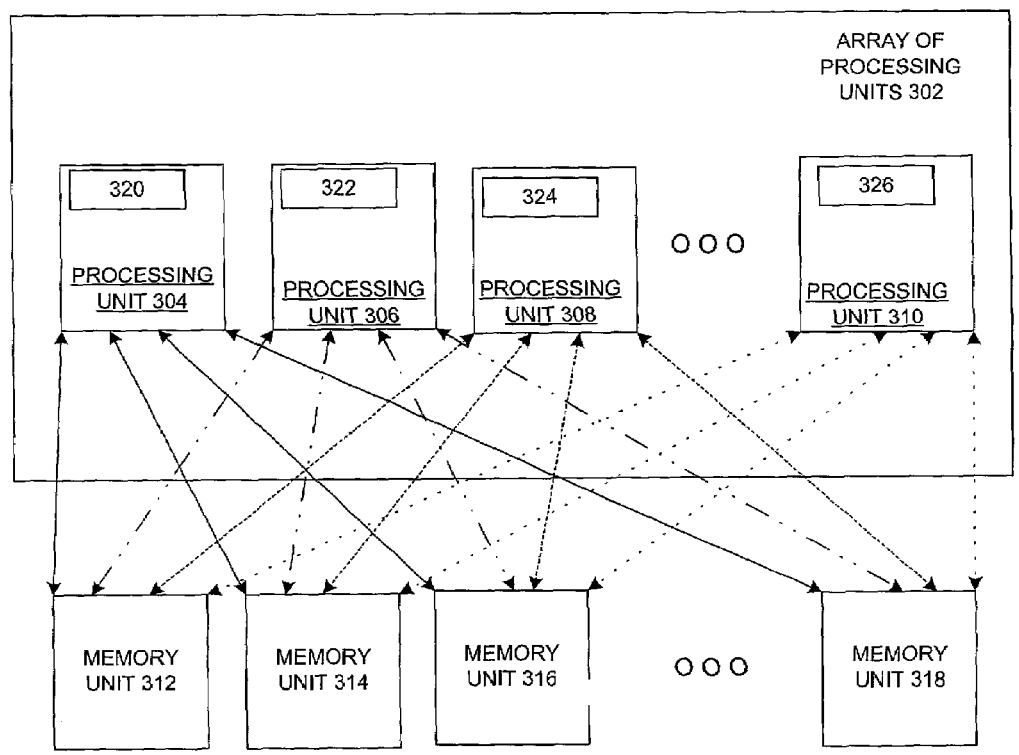
FIG. 3 illustrates a block diagram of ingress packet processing circuitry 212*a–d* or egress packet processing circuitry 214*a–d*, according to embodiments of the present invention.

FIG. 3 illustrates a block diagram of ingress packet processing circuitry 212a–d or egress packet processing circuitry 214a–d, according to embodiments of the present invention. In particular, FIG. 3 includes array of processing units 302 along with memory unit 312, memory unit 314, memory unit 316 and memory unit 318. Additionally, array of processing units 302 includes processing unit 304, processing unit 306, processing unit 308 and processing unit 310.

The number of processing units and memory units within the block diagram of FIG. 3 is by way of example and not by way of limitation. In particular, as shown by the " . . . " within the block diagram of FIG. 3, ingress packet processing circuitry 212a–d and egress packet processing circuitry 214*a–d* can include any number of processing units and memory units therein, according to embodiments of the present invention.

Moreover, each of processing units 304–310 is coupled to each of memory units 312–318, thereby allowing for communication between any given processing unit and any given memory unit. In particular, processing unit 304 is coupled to memory units 312–318, while processing unit 306 is coupled to memory units 312–318. Similarly, processing unit 308 is coupled to memory units 312–318, while processing unit 310 is also coupled to memory unit 312–318.

In an embodiment wherein array of processing units 302 and memory units 312–318 are incorporated into a network element, each of processing units 304–310 includes a packet descriptor cache. In particular, as illustrated by FIG. 3 processing unit 304 includes packet descriptor cache 320, and processing unit 306 includes packet descriptor cache 322. Additionally, processing unit 308 includes packet descriptor cache 324, and processing unit 310 includes packet descriptor cache 326.

Figure 4:
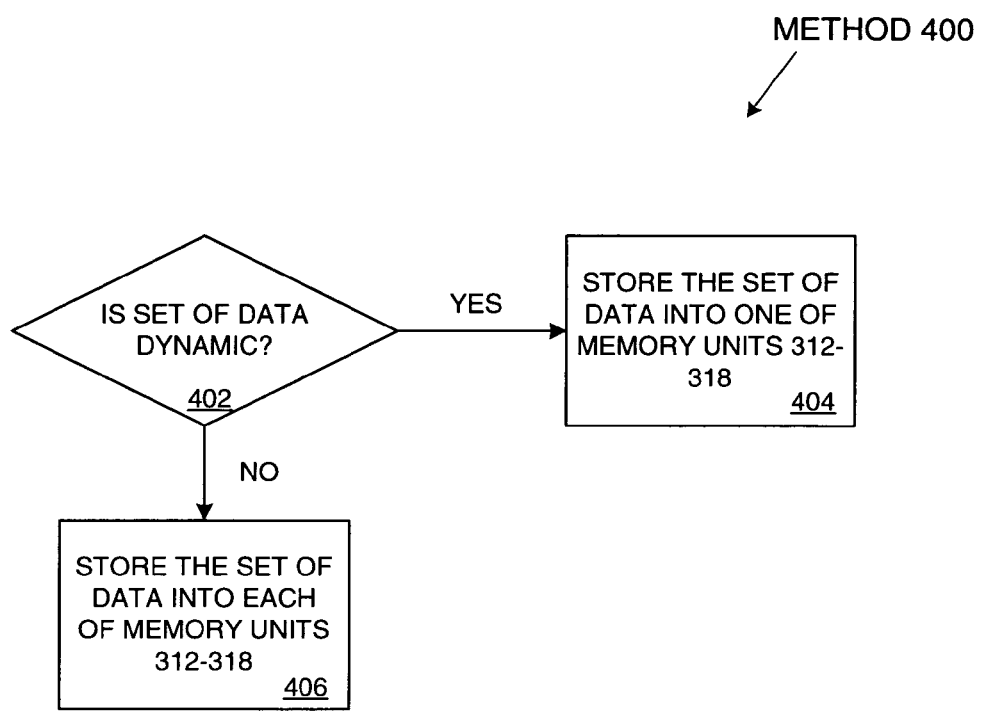
FIG. 4 is a flowchart for storage of data within memory units 310–314, according to embodiments of the present invention.
Figure 5:
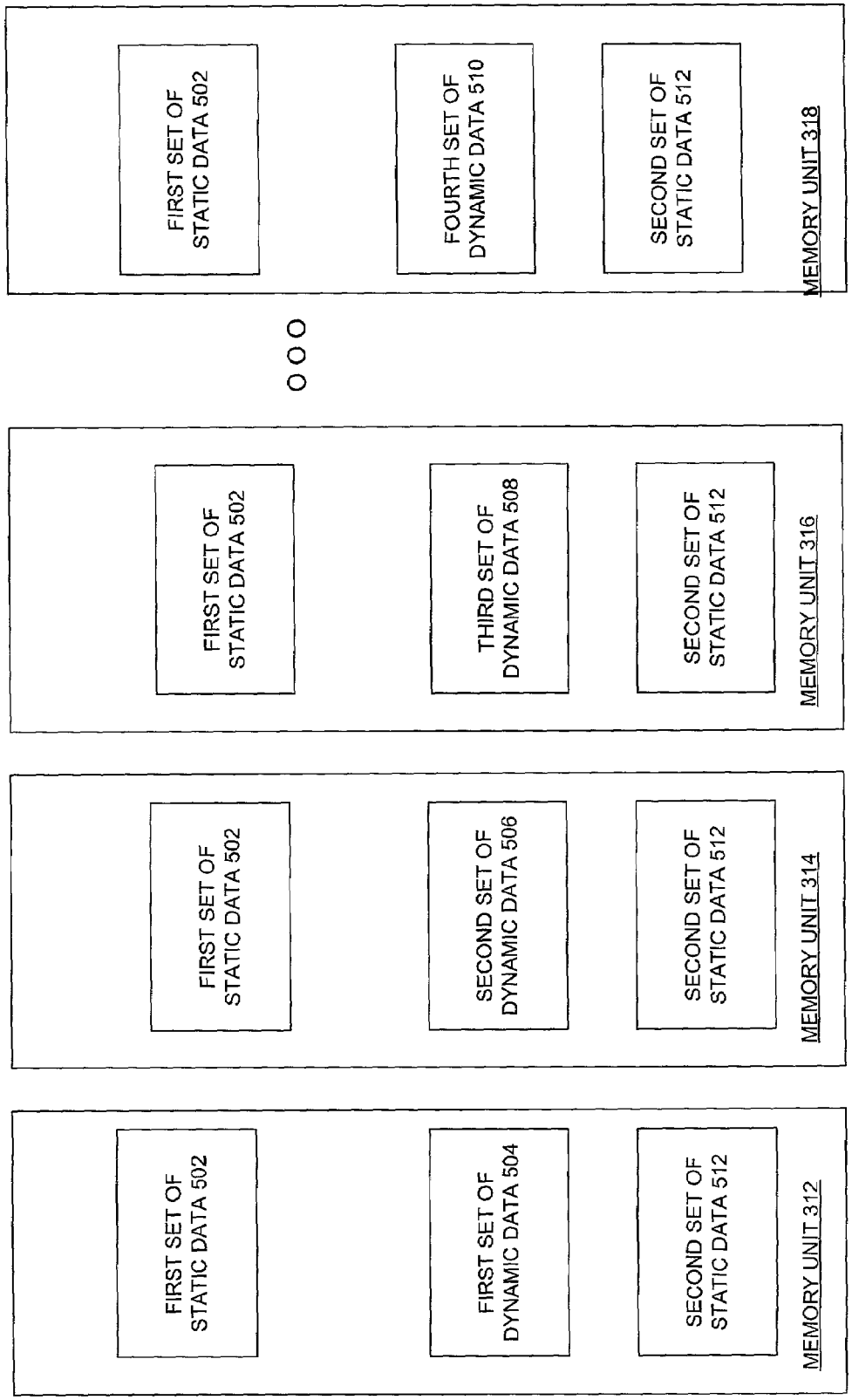
FIG. 5 illustrates a block diagram of memory units 310–314 having stored therein both dynamic and static sets of data, according to embodiments of the present invention.

The operation of array of processing units 302 and memory units 312–318 will now be described in more detail in conjunction with FIGS. 4 and 5. FIG. 4 is a flowchart for storage of data within memory units 312–318, according to embodiments of the present invention. Additionally, FIG. 5 illustrates a block diagram of memory units 312–318 having stored therein both dynamic and static sets of data, according to embodiments of the present invention. As shown in FIG. 5, memory units 312–318 include different sets of data stored therein. These sets of data can include one to any number of bits.

In particular, memory unit 312 includes first set of static data 502, first set of dynamic data 504 and second set of static data 512. Additionally, memory unit 314 includes first set of static data 502, second set of dynamic data 506 and second set of static data 512. Memory unit 316 includes first set of static data 502, third set of dynamic data 508 and second set of static data 512. Further, memory unit 318 includes first set of static data 502, fourth set of dynamic data 510 and second set of static data 512. These sets of data within memory units 312–318 will now be described in more detail in conjunction with FIG. 4.

In particular, FIG. 4 illustrates method 400 that commences when a unit, such as an Application Specific Integrated Circuit (ASIC) or other processing unit located external to ingress packet processing circuitry 212*a–d* or egress packet processing circuitry 214*a–d*, determines to store a set of data within one of memory units 312–318. For example, returning to FIG. 2, physical connection circuitry 210*a–d* could store or write data packets received from outside network elements 102–108 into any of memory units 312–318. In further illustration, one of ingress packet processing circuitry 212 could forward the data packet to one of egress packet processing circuitry 214 through packet mesh 226, thereby causing data packets to be written or stored into memory units 312–318 of egress packet processing circuitry 214. Moreover, in another embodiment, such a unit, which stores sets of data into memory units 312–318, can be one of processing units 304–310.

Upon determining to store a set of data within memory units 312–318, a unit determines whether the set of data is dynamic, at process decision block 402. In an embodiment, a "dynamic" set of data can be associated with specific types of data that are stored in memory units 312–318. For example when array of processing elements 302 and memory units 312–318 are within a network element for data packet transmission as described above in conjunction with FIGS. 1 and 2, data packets can be defined as dynamic while other types of data, such as an IP address forwarding table, stored in memory units 312–318 can be considered static (i.e., non-dynamic).

In one embodiment, multiple units, either internal or external to ingress packet processing circuitry 212*a–d* or egress packet processing circuitry 214*a–d*, can store sets of data within memory units 312–318. In one such embodiment, a first unit may only store a given set of data, such as dynamic data, in memory units 312–318, while a second unit may only store a different set of data, such as static data, in multiple of memory units 312–318. Accordingly, in such an embodiment, the decision of whether a set of data is stored within one or multiple memory units 312–318 is dictated by the unit that is performing the store. For example, returning to FIGS. 1 and 2, physical connection circuitry 210*a–d*, a first unit, may only store data packets as dynamic sets of data, into memory units 312–318, while control card(s) 220, a second unit, may only store table and configuration information, such as an IP address table, as static sets of data into memory units 312–318.

In another embodiment, a "dynamic" set of data is defined to include data that does not remain in memory units 312–318 for more than a predetermined threshold. This predetermined threshold is configurable based on the type of data that is being incorporated into embodiments of the present invention.

For example, in an embodiment wherein array of processing elements 302 and memory units 312–318 are within a network element for data packet transmission as described above in conjunction with FIGS. 1 and 2, a set of data that remains within memory units 312–318 for less than a predetermined threshold is a data packet that is received for transmission through the network to which the network element is attached. Such a data packet is typically buffered within memory units 312–318 until one of processing units 304–310 processes the packet to determine the packet's transmission, such that the packet is forwarded based on the address associated with this data packet. For example, one of processing units 304–310 determines the packet's destination based on an Internet Protocol (IP) address-forwarding table. A data packet is by way of example of a dynamic set of data and not by way of limitation, as any other type of data that does not remain within memory units 312–318 for a predetermined threshold can also be defined as dynamic.

In an embodiment, if the set of data is dynamic, the unit stores this data into one of memory units 312–318, at process block 404. Returning to FIGS. 1 and 2, in an embodiment, a given data packet being transmitted and/or received within system 100 is broken into a number of sets of data, which are stored in memory units 312–318. In one such embodiment, a given set of data includes 256 bytes. Moreover, in an embodiment, the unit generates a packet descriptor that is placed into each of packet descriptor caches 320–326 within processing units 304–310. This packet descriptor includes a pointer that points to the head of a given data packet. Moreover, when a given data packet is across more than a single set of data within memory units 312–318, a preceding set of data includes a pointer to the subsequent set of data, thereby allowing processing units 304 310 to locate the data packet within memory units 312–318. In one embodiment, the different sets of data that comprise a given data packet can be stored across memory units 312–318.

Returning to FIG. 5 to help illustrate, assume that a given data packet stored in memory units 312–318 includes, in the following order, third set of dynamic data 508, second set of dynamic data 506, and fourth set of dynamic data 510. Accordingly, a packet descriptor stored in packet descriptor caches 320–326 of processing units 304–310 includes a pointer for this given data packet that points to third set of dynamic data 508. Additionally, third set of dynamic data 508 includes a pointer that points to the location of second set of dynamic data 506. Similarly, second set of dynamic data 506 includes a pointer that points to the location of fourth set of dynamic data 510. Accordingly, when processing this given data packet, one of processing units 304–310 accesses or reads third set of dynamic data 508 based on the packet descriptor stored in packet descriptor caches 320–326 within processing units 304–310 and follows the pointers to the subsequent sets of data associated with this data packet (i.e., second set of dynamic data 506, and fourth set of dynamic data 510). In an embodiment wherein the data packet is an IP packet, the beginning of the data packet includes a header that enables one of processing units 304–310 to forward or switch the data packet based on an IP address contained therein.

The above-described example illustrated the storing of a set of dynamic data within only one of memory units 312–318. However, embodiments of the present invention are not so limited. In another embodiment, such data could be stored in two of memory units 312–318. For example, returning to FIG. 5, first set of dynamic data 504 could be stored in both memory unit 312 and memory unit 314.

In one embodiment, if the set of data is not dynamic, such data is considered static and is stored into each of memory units 312–318, at process block 406. To further illustrate, FIG. 5 shows first set of static data 502 stored in memory unit 312, memory unit 314, memory unit 316 and memory unit 318. Additionally, second set of static data 512 is stored across memory unit 312, memory unit 314, memory unit 316 and memory unit 318. However, embodiments of the present invention are not limited to the storage of static data in all of memory units 312–318. For example, in another embodiment, sets of static data can be stored in one-half of the memory units. In an alternative embodiment, sets of static data can be stored in any two of the memory units.

Additionally, any of processing units 304–310 can also read sets of data that were written or stored in any of memory units 312–318. FIG. 6 is a flowchart for accessing or reading of data within memory units 312–318, according to embodiments of the present invention. FIG. 6 is described with reference to the reading or accessing of sets of data by processing unit 304. Embodiments of the present invention are not limited to the reading or accessing of sets of data by processing units 304–310. For example, units, such as physical connection circuitry 210*a*–*d*, external to ingress packet processing circuitry 212*a*–*d* or egress packet processing circuitry 214*a*–*d* can read or access the sets of data from memory units 312–318, according to embodiments of the present invention.

Method 600 of FIG. 6 commences when data is going to be read or accessed by processing unit 304. Processing unit 304 determines the location of the set of data to be read from within memory units 312–318, at process block 602. In an embodiment wherein a data packet is being accessed, processing unit 304 determines the beginning location of this data packet using a packet descriptor that is placed into packet descriptor cache 320 of processing unit 304, as described above. In particular, the packet descriptor for this data packet includes the location of the data packet within memory units 312–318. As described above, a given data packet can be stored across multiple sets of data that can be stored across the different memory units 312–318.

This determination of a location for accessing a set of data from memory units 312–318 is by way of example and not by way of limitation, as other techniques can be employed for the determining of this location. For example, an instruction to be executed by processing unit 304 can identify this location, as is known in the art. Moreover, in an embodiment, the sets of data being accessed by processing unit 304 can be either static or dynamic. Accordingly, the static set of data can be stored across multiple memory units 312–318, thereby having multiple locations within such memory units. Processing unit 304, therefore, may have determined multiple locations from which to access the set of data from.

Processing unit 304 determines whether the set of data to be read or accessed is dynamic, at process decision block 604. Upon determining that the set of data is dynamic, processing unit 304 reads the set of data from the given memory unit from among memory units 312–318 wherein the data is stored, at process block 606. Conversely, upon determining that the set of data is non-dynamic (i.e., static), processing unit 304 attempts to access the set of data from memory unit 312. Processing unit 304 determines whether memory unit 312 is available to access the set of data therefrom, at process decision block 608. Memory unit 312 could be unable access the set of data from memory unit 312 for different reasons. One reason may be that another device, such as processing unit 306, may be accessing data from memory unit 310 at the time that processing unit 304 is trying to access the set of data. Another reason may be that memory unit 312 may not be operating such that no devices can access sets of data therefrom.

Upon determining that memory unit 312 can be accessed, processing unit 304 accesses the set of data from memory unit 312, at process block 610. However, if that memory unit 312 is unavailable for accessing of the set of data, processing unit 304 determines whether memory unit 314 is available to access the set of data therefrom, at process decision block 612. Upon determining that memory unit 314 can be accessed, processing unit 304 accesses the set of data from memory unit 314, at process block 614. However, if that memory unit 314 is unavailable for accessing of the set of data, processing unit 304 determines whether memory unit 316 is available to access the set of data therefrom, at process decision block 616. Upon determining that memory unit 316 can be accessed, processing unit 304 accesses the set of data from memory unit 316, at process block 618. However, if memory unit 316 is unavailable for accessing of the set of data, processing unit 304 determines accesses the set of data from memory unit 318, at process block 620.

FIG. 6 illustrates the accessing of a set of static data beginning with memory unit 312, then memory unit 314, followed by memory unit 316 and then memory unit 318. This order of traversal is by way of example and not by way of limitation, as embodiments of the present invention can employ any other order of traversal of memory units that have stored a set of the static data.

As illustrated, embodiments of the present invention provide for the storage of sets of data across multiple memory units, such that not every set of data is stored in every memory unit, while providing storage across multiple memory units for those sets of data that are more likely to remain within such memory units for a longer period in comparison to other sets of data. Accordingly, embodiments of the present invention preclude bottlenecking at a given memory unit, as sets of data are copied across multiple memory units. Additionally, embodiments of the present invention provide a configuration such that not every set of data is required to be copied into every memory unit.

The operation for the storage of the data within memory units 312–318 is described in terms of processing units 304–310 performing this task. However, embodiments of the present invention are not so limited, as other units are capable of performing this storage of data within memory units 312–318. For example, a processing unit that is external to ingress packet processing circuitry 212*a–d* or egress packet processing circuitry 214*a–d* could store data into memory units 312–318, according to embodiments of the present invention.

Memories described herein include a machine-readable medium on which is stored a set of instructions (i.e., software) embodying any one, or all, of the methodologies described herein. Software can reside, completely or at least partially, within these memories and/or within processors and/or storage devices. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for sharing memory space of multiple memory units by multiple processing units have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   storing a number of sets of static data across more than one memory unit of at least two memory units;
   storing a number of sets of dynamic data within a single memory unit, such that a processing unit can read the set of static data from any of the at least two memory units; and
   reading at least one of the number of sets of static data from an accessible one of the at least two memory units, upon determining that other ones of the at least two memory units are not accessible.

2. The method of claim 1, wherein the number of sets of the static data includes a forwarding table for data transmission of data packets across a network.

3. The method of claim 1, wherein the number of sets of dynamic data includes data packets to be processed by a processing unit within a network element.

4. The method of claim 3, wherein a first data packet of the data packets is stored across more than one of the number of sets of dynamic data.

5. The method of claim 4, further comprising storing a pointer to a first set of dynamic data of the number of sets of dynamic data that represent the first data packet.

6. The method of claim 1, wherein storing the set of static data across more than one memory unit of the at least two memory units includes storing the set of static data across each of the at least two memory units.

7. A method comprising:
   storing a set of data across more than one of at least two memory units upon determining that the number of sets of data is static;
   storing the set of data within a single memory unit of the at least two memory units upon determining that the set of data is dynamic; and
   reading at least one of the set of data from an accessible one of the at least two memory units if the set of data is static, upon determining that other ones of the at least two memory units are not accessible.

8. The method of claim 7, wherein the set of data that is static includes a forwarding table for data transmission of data packets across a network.

9. The method of claim 7, wherein the set of data that is dynamic includes data packets to be processed by a processing unit within a network element.

10. The method of claim 7, wherein storing the set of data across more than one of at least two memory units union determining that the number of sets of data is static includes storing the set of data that is static across each of the at least two memory units.

11. A method of accessing a set of data from a number of memory units, the method comprising:
    reading the set of data from a single memory unit from the number of memory units, upon determining that the set of data is dynamic; and
    reading the set of data from any accessible one of the number of memory units, upon determining that the set of data is static and upon determining that other ones of the number of memory units are not accessible.

12. The method of claim 11, wherein the set of data that is static includes a forwarding table for data transmission of data packets across a network.

13. The method of claim 11, wherein the set of data that is dynamic includes data packets to be processed by a processing unit within a network element.

14. A method of reading a set of data from a number of memory units, the method comprising:
    reading the set of data from a single memory unit from the number of memory units, upon determining that the set of data is dynamic;
    upon determining that the set of data is static, performing the following:
       reading the set of data from a first memory unit from the number of memory units, upon determining that the first memory unit is accessible;
       reading the set of data from a second memory unit from the number of memory units, upon determining that the first memory unit is not accessible and the second memory unit is accessible;
       reading the set of data from a third memory unit from the number of memory units, upon determining that the first memory unit and the second memory unit are not accessible and the third memory unit is accessible; and
       reading the set of data from a fourth memory unit from the number of memory units, upon determining that the first memory unit, the second memory unit and the third memory unit are not accessible and the fourth memory unit is accessible.

15. The method of claim 14, wherein the set of data that is static includes a forwarding table for data transmission of data packets across a network.

16. The method of claim 14, wherein the set of data that is dynamic includes data packets to be processed by a processing unit within a network element.

17. An apparatus comprising:
    a first memory unit to store a set of static data and a first set of dynamic data, wherein the dynamic data includes data packets to be transmitted across the network;

a second memory unit coupled to the first memory unit, the second memory unit to store the set of static data and a second Set of dynamic data;

a first processing unit coupled to the first and second memory units, wherein the first processing unit can read the set of static data from the first memory unit or the second memory unit; and a second processing unit coupled to the first and second memory units and the first processing unit, wherein the second processing unit can read the set of static data from the first memory unit or the second memory unit, wherein the first processing unit and the second processing unit include a packet descriptor cache, the packet descriptor cache to include pointers to a first portion of the data packets stored in the first and second memory units, and wherein the set of static data is read from an accessible one of the memory units, upon determining that other one of the memory units is not accessible.

18. The apparatus of claim 17, wherein the static data includes a forwarding table for data transmission of data packets across a network.

19. A network element for switching data packets across a network, the network element comprising:

a number of line cards, each line card comprising:

a first memory unit to store au Internet Protocol (IP) address table and a first number of portions of the data packets;

a second memory unit coupled to the first memory unit, the second memory unit to store the IP address table and a second number of portions of the data packets;

a first processing unit coupled to the first and second memory units, wherein the first processing unit can read the IP address table from the first memory unit or the second memory unit; and a second processing unit coupled to the first and second memory units and the first processing unit, wherein the second processing unit can read the IP address table from the first memory unit or the second memory unit; and a control card coupled to the number of line cards, wherein the control card can update the IP address table.

20. The network element of claim 19, wherein the first processing unit and the second processing unit include a packet descriptor cache, the packet descriptor cache to include pointers to a first portion of the data packets stored in the first and second memory units.

21. A machine-readable medium that provides instructions, which when executed by a machine, cause said machine to perform operations comprising:

storing a number of sets of static data across more than one memory unit of at least two memory units; and storing a number of sets of dynamic data within a single memory unit, such that a processing unit can read the set of static data from any of the at least two memory units; and rending at least one of the number of sets of static data from an accessible one of the at least two memory units, upon determining that other ones of the at least two memory units are not accessible.

22. The machine-readable medium of claim 21, wherein the number of sets of the static data includes a forwarding table for data transmission of data packets across a network.

23. The machine-readable medium of claim 21, wherein the number of sets of dynamic data includes data packets to be processed by a processing unit within a network element.

24. The machine-readable medium of claim 23, wherein a first data packet of the data packets is stored across more than one of the number of sets of dynamic data.

25. The machine-readable medium of claim 24, further comprising storing a pointer to a first set of dynamic data of the number of sets of dynamic data that represent the first data packet.

26. The machine-readable medium of claim 21, wherein storing the set of static data across more than one memory unit of the at least two memory units includes storing the set of static data across each of the at least two memory units.

27. A machine-readable medium that provides instructions, which when executed by a machine, cause said machine to perform operations comprising:

storing a set of data across more than one of at least two memory units upon determining that the number of sets of data is static;

storing the set of data within a single memory unit of the at least two memory units upon determining that the set of data is dynamic; and reading at least one of the set of data from an accessible one of the at least two memory units if the set of data is static, upon determining that other ones of the at least two memory units are not accessible.

28. The machine-readable medium of claim 27, wherein the set of data that is static includes a forwarding table for data transmission of data packets across a network.

29. The machine-readable medium of claim 27, wherein the set of data that is dynamic includes data packets to be processed by a processing unit within a network element.

30. The machine-readable medium of claim 27, wherein storing the set of data across more than one of at least two memory units upon determining that the number of sots of data is static includes storing the set or data that is static across each of the at least two memory units.

31. A machine-readable medium that provides instructions for accessing a set of data Thom a number of memory units, the instructions when executed by a machine, cause said machine to perform operations comprising:

reading the set of data from a single memory unit from the number of memory units, upon determining that the set of data is dynamic; and reading the set of data from any accessible one of the number of memory units, upon determining that the set of data is static and upon determining that other ones of the number of memory units are not accessible.

32. The machine-readable medium of claim 31, wherein the set of data that is static includes a forwarding table for data transmission of data packets across a network.

33. The machine-readable medium of claim 31, wherein the set of data that is dynamic includes data packets to be processed by a processing unit within a network element.

34. A machine-readable medium that provides instructions for reading a set of data from a number of memory units, the instructions when executed by a machine, cause said machine to perform operations comprising:

reading the set of data from a single memory unit from the number of memory units, upon determining that the set of data is dynamic;

upon determining that the set of data is static, performing the following:

reading the set of data from a first memory unit from the number of memory units, upon determining that the first memory unit is accessible;

reading the set of data from a second memory unit from the number of memory units, upon determining that the first memory unit is not accessible and the second memory unit is accessible;

reading the set of data from a third memory unit from the number of memory units, upon determining that the first memory unit and the second memory unit are not accessible and the third memory unit is accessible; and reading the set of data from a fourth memory unit from the number of memory units, upon determining that the first memory unit, the second memory unit and the third memory unit are not accessible and the fourth memory unit is accessible.

35. The machine-readable medium of claim 34, wherein the set of data that is static includes a forwarding table for data transmission of data packets across a network.

36. The machine-readable medium of claim 34, wherein the set of data that is dynamic includes data packets to be processed by a processing unit within a network element.

37. An apparatus comprising:
- a first memory unit to store a set of static data and a first set of dynamic data;
- a second memory unit coupled to the first memory unit, the second memory unit to stole the set of static data and a second set of dynamic data;
- a first processing unit coupled to the first and second memory units, wherein the first processing unit can read the set of static data from the first memory unit or the second memory unit; and
- a second processing unit coupled to the first and second memory units and the first processing unit, wherein the second processing unit can read the set of static data from the first memory unit or the second memory unit,
- wherein the first processing unit and the second processing unit include a packet descriptor cache, the packet descriptor cache to include pointers to a first portion of the data packets stored in the first and second memory units, and
- wherein the set of static data is read from an accessible one of the memory units, upon determining that other one of the memory units is not accessible.

38. The apparatus of claim 37, wherein the static data includes a forwarding table for data transmission of data packets across a network.

39. A method within a network element, comprising:
- storing static data within a plurality of memory units, and storing dynamic data within one of the plurality of memory units; and
- reading the static data and the dynamic data by using a processing unit having a packet descriptor cache that includes pointers to packets within the plurality of memory wherein the static data is read from an accessible one of the plurality memory units, upon determining that other ones of the plurality of memory units are not accessible.

40. The method of claim 39, wherein the static data includes a forwarding table for transmission of the packets across a network.

41. The method of claim 39, wherein the dynamic data includes data packets to be transmitted across a network.

* * * * *